(12) United States Patent
Mikurino et al.

(10) Patent No.: US 11,739,824 B1
(45) Date of Patent: Aug. 29, 2023

(54) WATERPROOF CASE AND CONTINUOUSLY VARIABLE TRANSMISSION

(71) Applicant: KAWASAKI MOTORS, LTD., Akashi (JP)

(72) Inventors: Kodai Mikurino, Akashi (JP); Ryosuke Atsumi, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 0 days.

(21) Appl. No.: 17/660,458

(22) Filed: Apr. 25, 2022

(51) Int. Cl.
  *F16H 57/035* (2012.01)
  *F16H 57/029* (2012.01)
  *F16H 9/14* (2006.01)
  *F16H 57/031* (2012.01)
  *F16H 57/02* (2012.01)

(52) U.S. Cl.
  CPC ............ *F16H 57/035* (2013.01); *F16H 9/14* (2013.01); *F16H 57/029* (2013.01); *F16H 57/031* (2013.01); *F16H 2057/02043* (2013.01)

(58) Field of Classification Search
  CPC ............ F16H 57/0489; F16H 57/0416; F16H 57/027; F16H 57/035; F16H 57/031
  USPC ......................................................... 474/144
  See application file for complete search history.

(56) References Cited

U.S. PATENT DOCUMENTS

| | | | | |
|---|---|---|---|---|
| 4,671,781 A * | 6/1987 | Tanaka | ................. | F16H 57/0412 474/93 |
| 4,671,782 A * | 6/1987 | Ochiai | ................. | F16H 57/0415 474/93 |
| 7,686,123 B2 * | 3/2010 | Ishida | ....................... | F28F 3/12 180/311 |
| 8,613,335 B2 * | 12/2013 | Deckard | ............... | F16H 57/027 180/68.1 |
| 9,863,523 B2 * | 1/2018 | Stocks | ...................... | F16H 9/14 |
| 9,909,659 B2 * | 3/2018 | Bessho | ..................... | F16H 9/18 |
| 10,648,554 B2 * | 5/2020 | Kuhl | .................. | F16H 57/0489 |
| 10,697,532 B2 * | 6/2020 | Schleif | .................. | F16H 57/027 |
| 2006/0213318 A1 * | 9/2006 | Hibbler | ................. | F16H 57/037 74/607 |
| 2012/0031688 A1 * | 2/2012 | Safranski | ............. | B60K 17/165 280/124.135 |
| 2012/0031694 A1 * | 2/2012 | Deckard | ................ | B60K 13/06 29/402.03 |
| 2012/0289370 A1 * | 11/2012 | Yamanishi | ............. | B60K 17/08 474/93 |

(Continued)

*Primary Examiner* — Henry Y Liu
(74) *Attorney, Agent, or Firm* — Alleman Hall Creasman & Tuttle LLP

(57) ABSTRACT

In a waterproof case, a contact surface of a specific member that is a case main body or a cover is a surface extending along a predetermined oblique direction inclined relative to a perpendicular plane orthogonal to a die pull-out direction. The specific member includes a circumferential projection that projects from the contact surface in the die pull-out direction, is arranged circumferentially along the contact surface, and presses a sealing member. The circumferential projection includes an outer peripheral side surface and an inner peripheral side surface. In the first region, the circumferential projection has a tapered section in which the outer peripheral side surface is inclined relative to the die pull-out direction. In the second region, the circumferential projection has a tapered section in which the inner peripheral side surface is inclined relative to the die pull-out direction.

9 Claims, 6 Drawing Sheets

(56) References Cited

U.S. PATENT DOCUMENTS

| | | | |
|---|---|---|---|
| 2013/0033070 A1* | 2/2013 | Kinsman | B60J 5/0487 296/190.03 |
| 2013/0090198 A1* | 4/2013 | Itoo | F16H 57/03 474/93 |
| 2014/0262584 A1* | 9/2014 | Lovold | B60K 17/354 180/246 |
| 2015/0308561 A1* | 10/2015 | Itoo | F16H 57/027 474/146 |
| 2015/0377341 A1* | 12/2015 | Renner | F16H 57/0416 474/93 |
| 2016/0061314 A1* | 3/2016 | Kuhl | F16H 57/0416 474/8 |
| 2018/0180163 A1* | 6/2018 | Schleif | F16H 57/0416 |
| 2019/0285160 A1* | 9/2019 | Nelson | F16H 57/0489 |

* cited by examiner

WATERPROOF CASE AND CONTINUOUSLY VARIABLE TRANSMISSION

BACKGROUND OF THE INVENTION

Field of the Invention

The present disclosure relates to a waterproof case including a sealing member interposed between a case main body and a cover, and a continuously variable transmission.

Description of the Related Art

U.S. Pat. No. 10,648,554B2 discloses a continuously variable transmission that changes a rotational speed of driving force input from an engine. The continuously variable transmission includes a CVT mechanism including a driving pulley, a driven pulley, and a belt wound around the driving pulley and the driven pulley. The CVT mechanism is accommodated in a CVT case including a case main body, a cover attachable to and detachable from the case main body, and a waterproof sealing member sandwiched between the case main body and the cover. The cover includes a projection that projects from a contact surface of the cover so as to press the sealing member toward the case main body. Moreover, cases other than the CVT case may be required to have a waterproof property.

SUMMARY OF THE INVENTION

A waterproof case according to one aspect of the present disclosure includes: a case main body including an accommodating space and an opening through which the accommodating space is open; a cover that closes the opening; a sealing member interposed between the case main body and the cover; and a fastener by which the cover is fastened to the case main body. A specific member that is the case main body or the cover includes a bottom wall and a peripheral wall that projects from the bottom wall in a predetermined die pull-out direction and includes a circumferential contact surface. The contact surface is a surface extending along a predetermined oblique direction inclined relative to a perpendicular plane orthogonal to the die pull-out direction. The peripheral wall includes a first region arranged at one side in the oblique direction and a second region arranged at the other side in the oblique direction, a projection amount of the second region from the bottom wall being smaller than a projection amount of the first region from the bottom wall. An axis of the fastener extends in a normal direction that is inclined relative to the die pull-out direction and perpendicular to the contact surface. The specific member includes a circumferential projection that projects from the contact surface in the die pull-out direction, is arranged circumferentially along the contact surface, and presses the sealing member. The circumferential projection includes an outer peripheral side surface and an inner peripheral side surface. In the first region, the circumferential projection has a tapered section in which the outer peripheral side surface is inclined relative to the die pull-out direction. In the second region, the circumferential projection has a tapered section in which the inner peripheral side surface is inclined relative to the die pull-out direction.

DESCRIPTION OF THE PREFERRED EMBODIMENTS

Hereinafter, an embodiment will be described with reference to the drawings.

Figure 1:
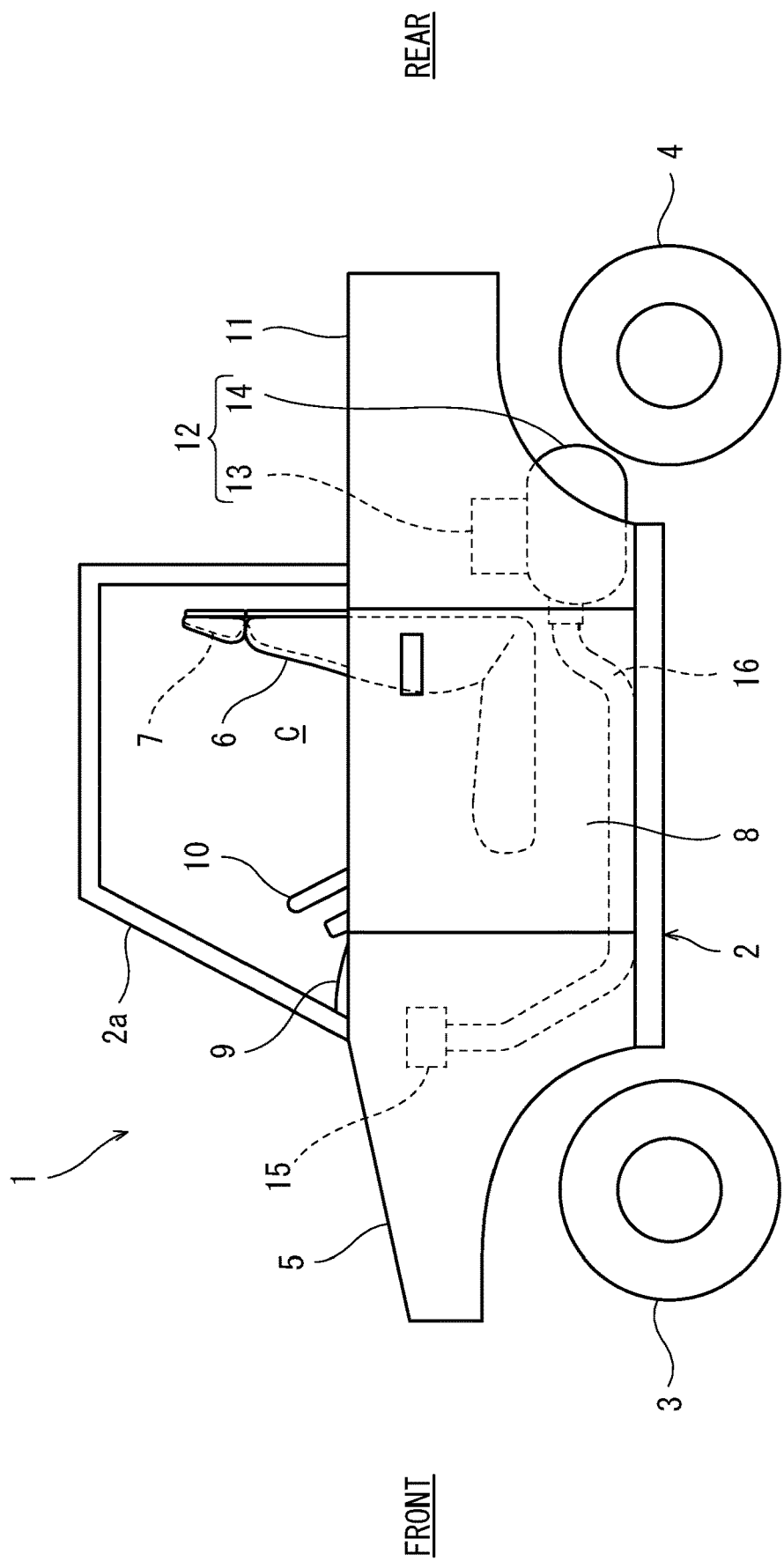
FIG. 1 is a schematic left side view of a utility vehicle according to an embodiment.

FIG. 1 is a schematic left side view of an off-road vehicle 1 according to the embodiment. As shown in FIG. 1, the off-road vehicle 1 includes a vehicle body frame 2, a pair of left and right front wheels 3 supporting a front portion of the vehicle body frame 2, and a pair of left and right rear wheels 4 supporting a rear portion of the vehicle body frame 2. Tires of the front wheels 3 and the rear wheels 4 are, for example, balloon tires for uneven ground traveling. The off-road vehicle 1 may be referred to as a utility vehicle. A space between the left and right front wheels 3 is covered with a hood 5 from above. A driver's seat 6 and a passenger seat 7 are arranged side by side behind the hood 5 and are supported by the vehicle body frame 2.

The vehicle body frame 2 is a pipe frame including pipes connected to each other. The vehicle body frame 2 includes, for example, a cabin frame 2a surrounding an occupant space C where the driver's seat 6 and the passenger seat 7 are arranged. Entrances that are opened or closed by side doors 8 are open at both sides of the occupant space C. The occupant space C surrounded by the cabin frame 2a is exposed to an outside. A dash panel 9 is arranged in front of the driver's seat 6 and the passenger seat 7. A steering wheel 10 is located at the dash panel 9 so as to project toward the driver's seat 6.

A cargo bed 11 defining a hollow loading space that is open upward to an outside is arranged behind the cabin frame 2a. A driving source assembly 12 is mounted behind the driver's seat 6 and under the cargo bed 11. The driving source assembly 12 includes a prime mover 13 and a continuously variable transmission 14. The prime mover 13 may be an internal combustion engine, an electric motor, or a combination thereof. The continuously variable transmission 14 is adjacently located at a lateral side of the prime mover 13. Rotational power is output from the continuously variable transmission 14 to one or both of the front wheels 3 and the rear wheels 4. An air cleaner 15 that takes outside air therein is arranged in front of the steering wheel 10 and under the hood 5. The air cleaner 15 is connected to the continuously variable transmission 14 through an air-intake pipe 16. The outside air as cooling air is supplied to the continuously variable transmission 14 through the air cleaner 15 and the air-intake pipe 16.

Figure 2:
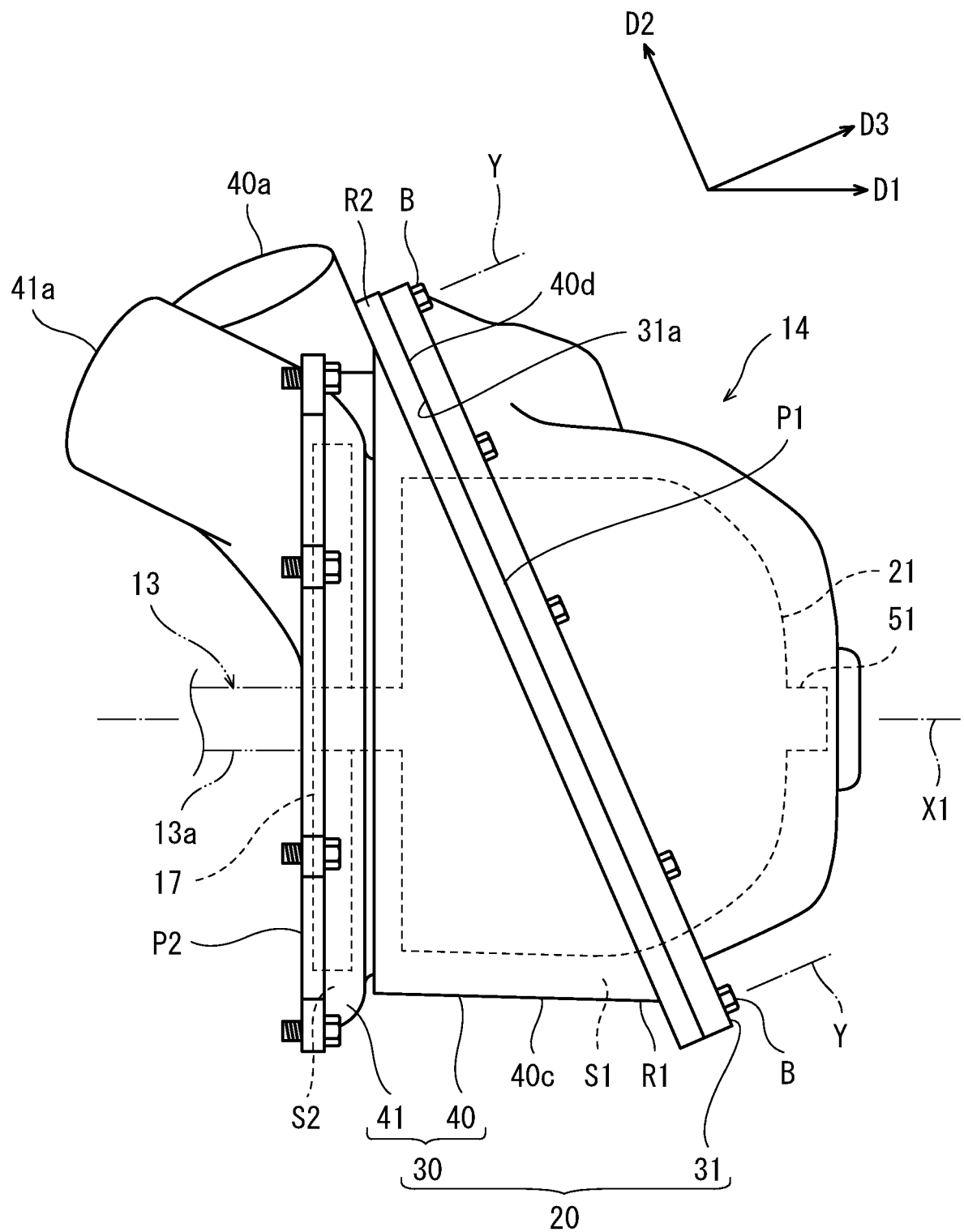
FIG. 2 is a side view of a continuously variable transmission of FIG. 1 when viewed from a front side of the vehicle.

FIG. 2 is a side view of the continuously variable transmission 14 of FIG. 1 when viewed from a front side of the vehicle. As shown in FIG. 2, the continuously variable transmission 14 includes a CVT case 20 and a CVT mechanism 21 accommodated in the CVT case 20. A driving shaft 13a of the prime mover 13 (see FIG. 1) is coupled to a below-described input shaft 51 (see FIG. 3) of the CVT mechanism 21 so as to be able to transmit power to the input shaft 51. When the prime mover 13 is an internal combustion engine, the driving shaft 13a is a crank shaft.

The CVT case 20 is a waterproof case. The CVT case 20 includes a case main body 30, a cover 31, and a sealing member 32. The case main body 30 and the cover 31 are made of resin. The case main body 30 defines a main accommodating space S1 together with the cover 31. The CVT case 20 includes an opening P1 through which the main accommodating space S1 is open in an axial direction X1 of the input shaft 51 (see FIG. 3). The cover 31 closes the opening P1 of the case main body 30 and is fixed to the case main body 30 by fasteners B, such as bolts.

The case main body 30 includes a main case 40 and an auxiliary case 41. The main case 40 defines the main accommodating space S1. The auxiliary case 41 is fixed to the main case 40 and defines an auxiliary accommodating space S2. The CVT mechanism 21 is arranged in the main accommodating space S1. A flywheel 17 fixed to the driving shaft 13a or the input shaft 51 is arranged in the auxiliary accommodating space S2. The auxiliary case 41 includes an opening P2 through which the auxiliary accommodating space S2 is open toward the prime mover 13. The opening P2 is closed by a plate fixed to a side surface of the prime mover 13. The auxiliary case 41 includes an inflow opening 41a into which the cooling air flows from the air-intake pipe 16 (see FIG. 1). A cooling air passage S3 (see FIG. 3) that makes the inflow opening 41a communicate with the main accommodating space S1 is defined between the main case 40 and the auxiliary case 41. The main case 40 includes an outflow opening 40a through which the cooling air in the main accommodating space S1 flows to an outside.

Figure 3:
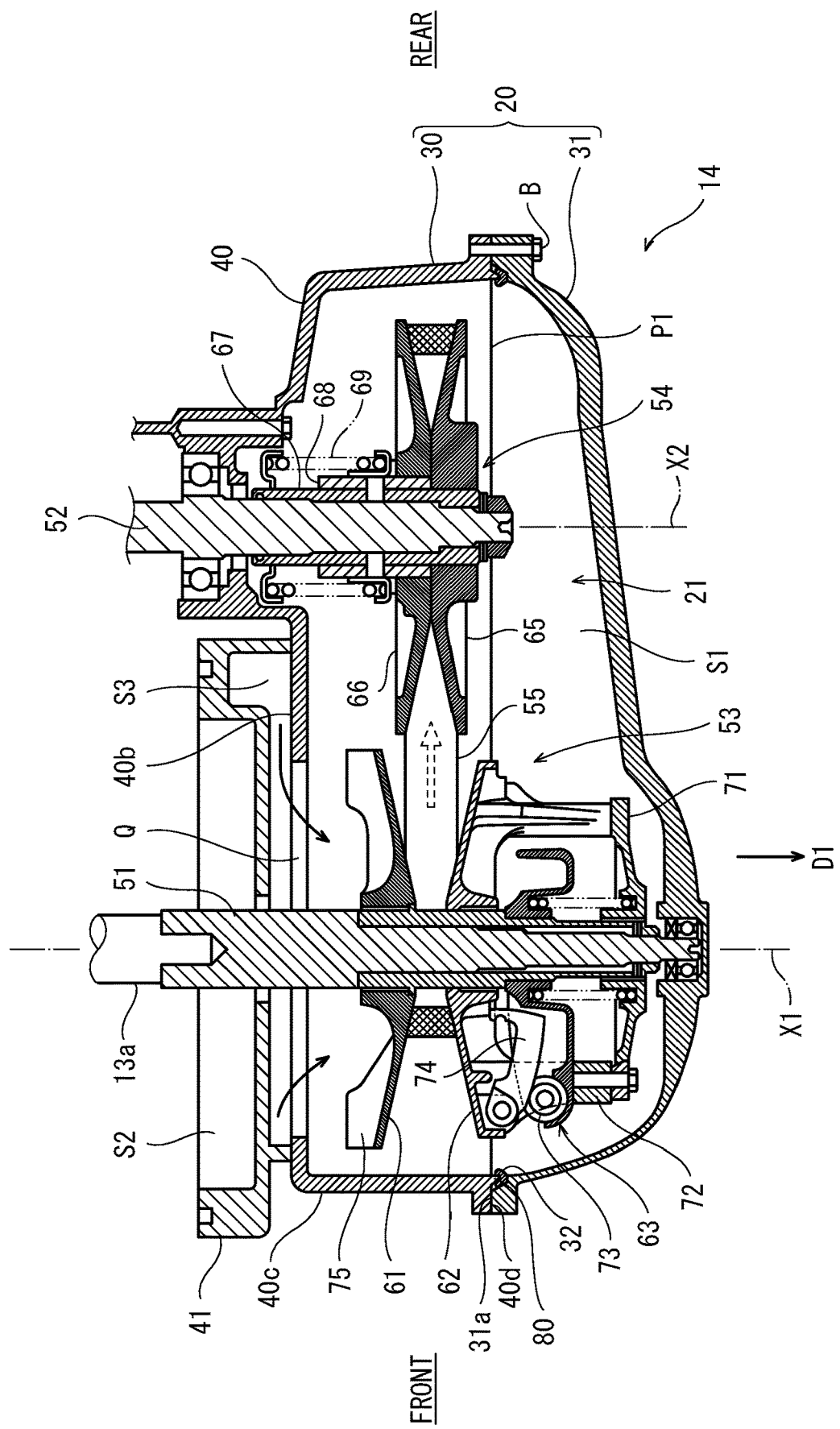
FIG. 3 is a horizontal sectional view of the continuously variable transmission of FIG. 2.

FIG. 3 is a horizontal sectional view of the continuously variable transmission 14 of FIG. 2. As shown in FIG. 2, the CVT mechanism 21 includes the input shaft 51, an output shaft 52, a driving pulley 53, a driven pulley 54, and a belt 55. An axis X1 of the input shaft 51 and an axis of the driving shaft 13a are located on the same straight line. A direction in which the axis X1 extends may be referred to as the axial direction X1. In the present embodiment, the driving shaft 13a and the input shaft 51 are directly coupled to each other, but a centrifugal clutch may be interposed between the driving shaft 13a and the input shaft 51.

Rotational power is input from the driving shaft 13a of the prime mover 13 to the input shaft 51. The driving pulley 53 is disposed at the input shaft 51 so as to rotate integrally with the input shaft 51. The driven pulley 54 is disposed at the output shaft 52 so as to rotate integrally with the output shaft 52. The output shaft 52 outputs the rotational power to one or both of the front wheels 3 and the rear wheels 4. The belt 55 having a V shape is wound around the driving pulley 53 and the driven pulley 54.

The driving pulley 53 includes: a fixed sheave 61 fixed to the input shaft 51; a movable sheave 62 fitted to the input shaft 51 so as to be movable in the axial direction X1; and a sheave thruster 63. The belt 55 is sandwiched between pressure surfaces of the fixed sheave 61 and the movable sheave 62. When the movable sheave 62 moves along the input shaft 51, and this changes an interval between the fixed sheave 61 and the movable sheave 62, a position, where the belt 55 is sandwiched, at the driving pulley 53 in a radial direction of the driving pulley 53 changes, i.e., an effective diameter of the driving pulley 53 changes.

For example, the sheave thruster 63 is of a flyweight type. The sheave thruster 63 mechanically moves the movable sheave 62 relative to the fixed sheave 61 in accordance with a rotational frequency of the driving pulley 53 such that the movable sheave 62 approaches or separates from the fixed sheave 61 in the axial direction X. The sheave thruster 63 includes a receiving plate 71, a coupling arm 72, a pressure receiving roller 73, and a flyweight 74. The receiving plate 71 is arranged at a back surface side of the movable sheave 62 and away from the movable sheave 62 in the axial direction X1. The pressure receiving roller 73 is supported by the receiving plate 71 through the coupling arm 72. The flyweight 74 is arranged at the back surface side of the movable sheave 62 and is supported by the movable sheave 62 while being in contact with the pressure receiving roller 73.

The flyweight 74 turns in a direction away from the movable sheave 62 by rotational centrifugal force of the driving pulley 53 to press the pressure receiving roller 73 in the axial direction X1 and moves the movable sheave 62 in a direction toward the fixed sheave 61 by reaction force from the pressure receiving roller 73. To be specific, by the rotational centrifugal force of the driving pulley 53, the sheave thruster 63 generates thrust that narrows the interval between the fixed sheave 61 and the movable sheave 62. A centrifugal fan blade 75 that generates swirling flow is disposed on a back surface of the fixed sheave 61.

The driven pulley 54 includes: a fixed sheave 65 fixed to the output shaft 52; and a movable sheave 66 fitted to the output shaft 52 so as to be movable in a direction (may be referred to as an axial direction X2) in which an axis X2 of the output shaft 52 extends. A cam cylinder 67 including spiral cam grooves is fixed to an outer peripheral surface of the output shaft 52. The cam cylinder 67 and the fixed sheave 65 rotate together with the output shaft 52. A sleeve 68 is integrally coupled to an inner peripheral end of the movable sheave 66. The sleeve 68 is fitted to an outer peripheral surface of the cam cylinder 67 so as to be movable in the axial direction X2 and supports a roller that is movable along the cam grooves of the cam cylinder 67.

The sleeve 68 is biased toward the fixed sheave 65 by a pressure regulating spring 69, and the movable sheave 66 is pressed toward the fixed sheave 65. When the movable sheave 66 receives rotational force by tensile force of the belt 55, thrust that moves the movable sheave 66 toward the fixed sheave 65 is generated by a cam action between the cam cylinder 67 and the roller.

When the rotational frequency of the input shaft 51 is low, the effective diameter of the driving pulley 53 is small, and the effective diameter of the driven pulley 54 is large (i.e., a reduction ratio is high). When the rotational frequency of the input shaft 51 increases, the movable sheave 62 approaches the fixed sheave 61 by the thrust of the sheave thruster 63 generated by the increase in centrifugal force, and this increases the effective diameter of the driving pulley 53. At the driven pulley 54, the tensile force of the belt 55 increases, and this increases force acting toward a radially inner side of the belt 55. Then, the movable sheave 66 moves in a direction away from the fixed sheave 65 against spring force of the pressure regulating spring 69 and cam thrust of the cam cylinder 67, and this decreases the effective diameter of the driven pulley 54 (i.e., the reduction ratio becomes low).

The main case 40 of the case main body 30 has a recessed section. The main case 40 is formed by using a die. When the forming is terminated, the die is pulled out from the main case 40 through the opening P2 in a predetermined die pull-out direction D1 (also see FIG. 2). In the present embodiment, the die pull-out direction D1 is the same as the axial direction X1. The main case 40 includes a bottom wall 40b opposed to the CVT mechanism 21 in the axial direction X1. The die pull-out direction D1 is a direction perpendicular to the bottom wall 40b of the case main body 30.

The bottom wall 40b includes a communication opening Q through which the input shaft 51 passes. The communication opening Q is opposed to a radially inner portion of the centrifugal fan blade 75 and makes the cooling air passage S3 communicate with the main accommodating space S1. The main case 40 includes a peripheral wall 40c that projects in the die pull-out direction D1 from a peripheral edge of the bottom wall 40b. An end surface of the peripheral wall 40c which surface is opposed to the cover 31 is a contact surface 40d. The cover 31 has a recessed section. The cover 31 includes a contact surface 31a that is in contact with the contact surface 40d of the main case 40.

Figure 4:
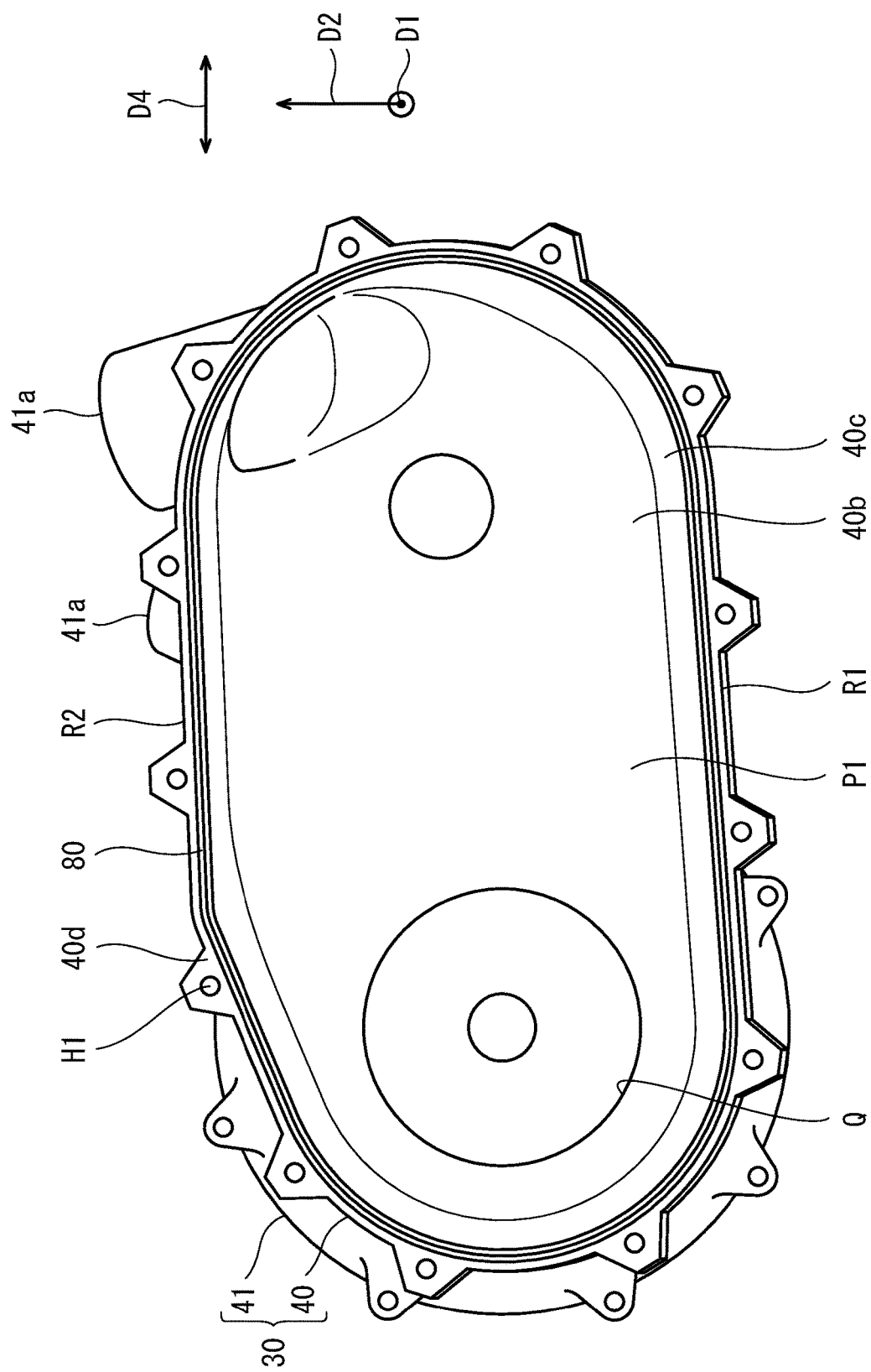
FIG. 4 is a front view of a case main body of a CVT case of FIG. 2 when viewed from a die pull-out direction.

FIG. 4 is a front view of the case main body 30 of the CVT case 20 of FIG. 2 when viewed from the die pull-out direction D1. As shown in FIG. 4, the peripheral wall 40c of the main case 40 includes the contact surface 40d that is an end surface extending circumferentially. The contact surface 40d includes fastening holes H1 arranged at intervals in a circumferential direction of the contact surface 40d. The main case 40 includes a circumferential projection 80 that projects from the contact surface 40d in the die pull-out direction D1. The circumferential projection 80 extends in a closed-loop shape along the circumferential direction of the contact surface 40d.

As shown in FIGS. 2 and 4, the contact surface 40d is located on a flat plane extending along an oblique direction D2 inclined relative to a perpendicular plane orthogonal to the die pull-out direction D1. The contact surface 40d includes: portions extending in the oblique direction D2; and portions extending in a lateral direction D4 orthogonal to the oblique direction D2 when viewed from the die pull-out direction D1. The lateral direction D4 is a direction in which the input shaft 51 and the output shaft 52 are lined up.

The peripheral wall 40c includes: a first region R1 arranged at one side in the oblique direction D2; and a second region R2 arranged at the other side in the oblique direction D2. A projection amount of the second region R2 from the bottom wall 40b in the die pull-out direction D1 is smaller than a projection amount of the first region R1 from the bottom wall 40b in the die pull-out direction D1 (also see FIG. 2). The first region R1 and the second region R2 are regions in which when viewed from the die pull-out direction D1, an extending direction of the contact surface 40d and an extending direction of the circumferential projection 80 are directions closer to the lateral direction D4 than to the oblique direction D2. In the present embodiment, the first region R1 is a lower region located at a lower side of the main case 40, and the second region R2 is an upper region located at an upper side of the main case 40.

An axis Y of the fastener B extends in a normal direction D3 perpendicular to the contact surface 40d. The normal direction D3 is a direction inclined relative to the die pull-out direction D1. Since the fastening power of the fastener B acts in the normal direction D3, the fastening power acts in a direction inclined relative to the die pull-out direction D1.

Figure 5A:
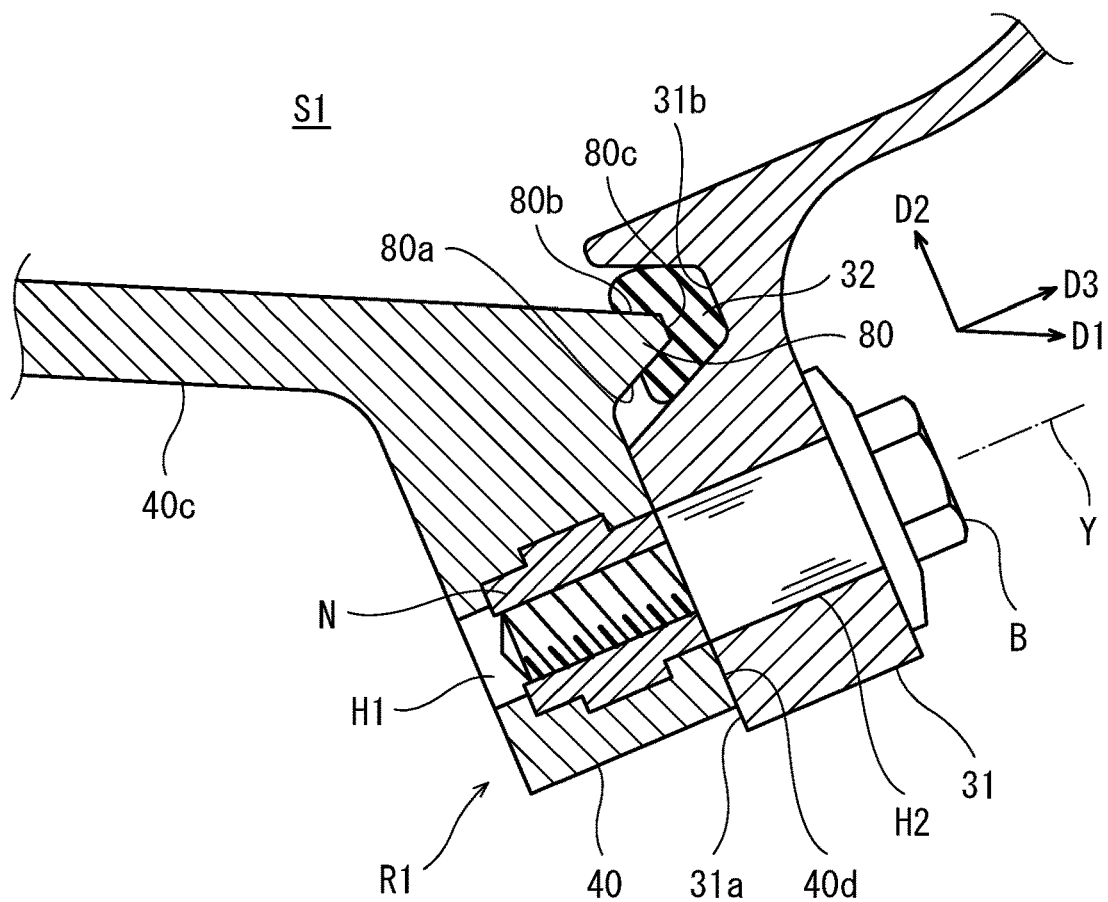
FIG. 5A is a vertical sectional view of contact surfaces of the CVT case in a first region of the case main body of FIG. 4.
Figure 5B:
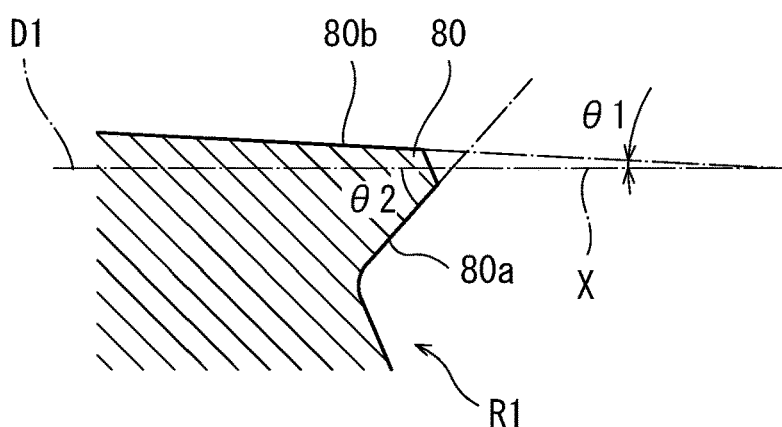
FIG. 5B is an enlarged sectional view of a circumferential projection in the first region of FIG. 5A.

FIG. 5A is a vertical sectional view of the contact surfaces 31a and 40d of the CVT case 20 in the first region R1 of the case main body 30 of FIG. 4. FIG. 5B is an enlarged sectional view of the circumferential projection 80 in the first region R1 of FIG. 5A. As shown in FIGS. 5A and 5B, the sealing member 32 is sandwiched between the case main body 30 and the cover 31. The sealing member 32 has a closed-loop shape extending along the circumferential direction of the circumferential projection 80. The sealing member 32 is made of an elastic material, such as rubber or silicone.

The cover 31 includes fastening holes H2 that coincide with the fastening holes H1 of the main case 40. Nuts N are inserted into the fastening holes H1 of the main case 40. With the contact surface 31a of the cover 31 in contact with the contact surface 40d of the main case 40, the fasteners B are inserted into the fastening holes H1 and H2 and are threadedly engaged with the nuts N. Thus, the cover 31 is fastened to the main case 40. The cover 31 includes a circumferential recess 31b that extends circumferentially along the contact surface 31a so as to be opposed to the circumferential projection 80 of the main case 40. The sealing member 32 is sandwiched between the circumferential projection 80 of the main case 40 and the circumferential recess 31b of the cover 31. To be specific, the circumferential projection 80 presses the sealing member 32 toward the circumferential recess 31b such that the sealing member 32 is pressed against the circumferential recess 31b. The sealing member 32 is a trim seal that has a horseshoe-shaped section and is attached to the circumferential projection 80 so as to cover a tip of the circumferential projection 80.

The circumferential projection 80 has a tapered section in the first region R1. The circumferential projection 80 includes an outer peripheral side surface 80a, an inner peripheral side surface 80b, and a tip surface 80c. The inner peripheral side surface 80b is an inner peripheral side surface that faces the main accommodating space S1. The outer peripheral side surface 80a is an outer peripheral side surface that faces an opposite side of the main accommodating space S1. The tip surface 80c is a surface that faces the normal direction D3 of the contact surface 40d. The tip surface 80c may be a flat surface or a projecting surface projecting in a circular-arc shape. In a sectional view orthogonal to the extending direction of the circumferential projection 80 in the first region R1, the inner peripheral side surface 80b extends in the die pull-out direction D1, and the outer peripheral side surface 80a is inclined relative to the die pull-out direction D1.

More specifically, in a sectional view orthogonal to the extending direction of the circumferential projection 80 in the first region R1, an inclination angle θ1 of the inner peripheral side surface 80b to the die pull-out direction D1 may be, for example, 0° or more and 10° or less. In a sectional view orthogonal to the extending direction of the circumferential projection 80 in the first region R1, an inclination angle θ2 of the outer peripheral side surface 80a to the die pull-out direction D1 is larger than the inclination angle θ1 of the inner peripheral side surface 80b to the die pull-out direction D1. The inclination angle θ2 of the outer peripheral side surface 80a in the first region R1 may be, for example, 20° or more and 60° or less, preferably 30° or more and 50° or less.

Figure 6A:
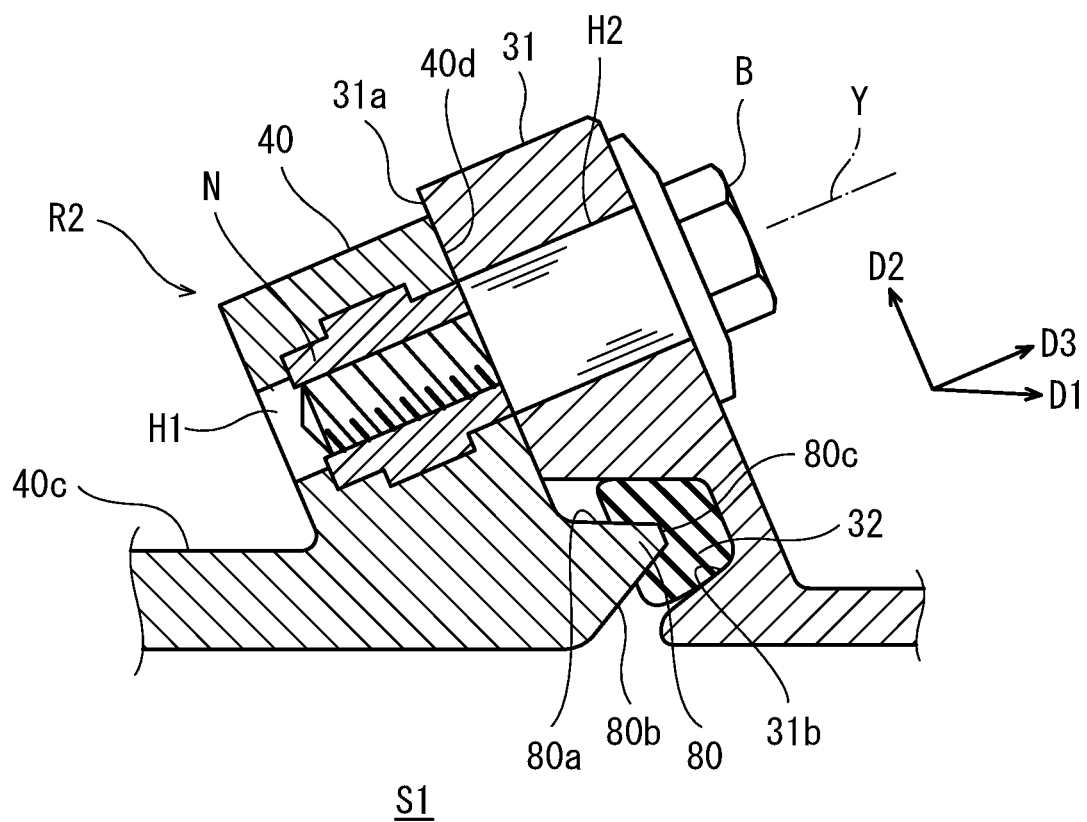
FIG. 6A is a vertical sectional view of the contact surfaces of the CVT case in a second region of the case main body of FIG. 4.
Figure 6B:
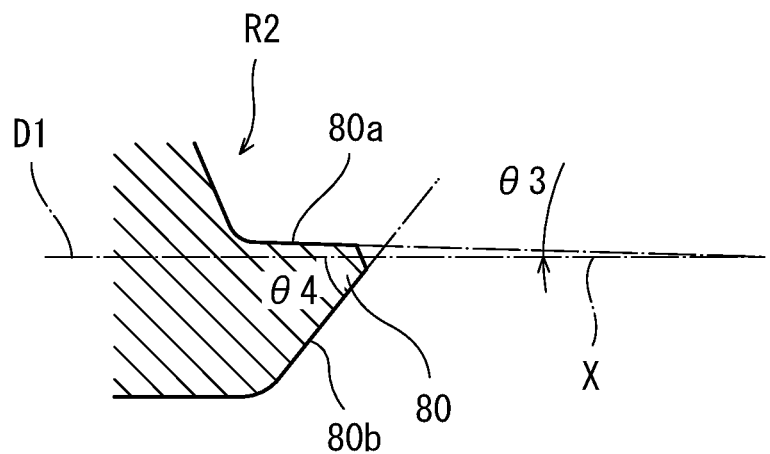
FIG. 6B is an enlarged sectional view of the circumferential projection in the second region of FIG. 6A.

FIG. 6A is a vertical sectional view of the contact surfaces 31a and 40d of the CVT case 20 in the second region R2 of the case main body 30 of FIG. 4. FIG. 6B is an enlarged sectional view of the circumferential projection 80 in the second region R2 of FIG. 6A. As shown in FIGS. 6A and 6B, the circumferential projection 80 has a tapered section in the second region R2. The inner peripheral side surface 80b of the circumferential projection 80 is an inner peripheral side surface that faces the main accommodating space 51. The outer peripheral side surface 80a of the circumferential projection 80 is an outer peripheral side surface that faces an opposite side of the main accommodating space 51. In a sectional view orthogonal to the extending direction of the circumferential projection 80 in the second region R2, the outer peripheral side surface 80a extends in the die pull-out direction D1, and the inner peripheral side surface 80b is inclined relative to the die pull-out direction D1.

More specifically, in a sectional view orthogonal to the extending direction of the circumferential projection 80 in the second region R2, an inclination angle θ3 of the outer peripheral side surface 80a to the die pull-out direction D1 may be, for example, 0° or more and 10° or less. In a sectional view orthogonal to the extending direction of the circumferential projection 80 in the second region R2, an inclination angle θ4 of the inner peripheral side surface 80b to the die pull-out direction D1 is larger than the inclination angle θ3 of the outer peripheral side surface 80a. The inclination angle θ4 of the inner peripheral side surface 80b in the second region R2 may be, for example, 20° or more and 60° or less, preferably 30° or more and 50° or less.

The inclination angle of the outer peripheral side surface 80a to the die pull-out direction D1 and the inclination angle of the inner peripheral side surface 80b to the die pull-out direction D1 change depending on positions in the circumferential direction of the circumferential projection 80. In a sectional view orthogonal to the extending direction of the circumferential projection 80, a sectional shape of the circumferential projection 80 in the first region R1 and a sectional shape of the circumferential projection 80 in the second region R2 are asymmetrical to each other. The inclination angle θ2 of the outer peripheral side surface 80a to the die pull-out direction D1 in the first region R1 is larger than the inclination angle θ3 of the outer peripheral side surface 80a to the die pull-out direction D1 in the second region R2. The inclination angle θ4 of the inner peripheral side surface 80b to the die pull-out direction D1 in the second region R2 is larger than the inclination angle θ1 of the inner peripheral side surface 80b to the die pull-out direction D1 in the first region R1.

According to the above-described configuration, the contact surface 40d of the main case 40 of the case main body 30 extends in the oblique direction D2 inclined relative to a vertical direction orthogonal to the die pull-out direction D1, and the axis Y of the fastener B extends in the normal direction D3 that is inclined relative to the die pull-out direction D1 and is perpendicular to the contact surface 40d. Therefore, work of fastening and unfastening the fastener B can be performed from a direction oblique to the die pull-out direction D1, and work of attaching and detaching the cover 31 can be performed from the direction oblique to the die pull-out direction D1.

The fastening power of the fastener B acts in the normal direction D3 of the contact surface 40d of the case main body 30, i.e., a direction inclined relative to the die pull-out direction D1. Therefore, bending stress acts on the first and second regions R1 and R2 of the circumferential projection 80 that projects from the contact surface 40d in the die pull-out direction D1. However, in the first region R1, the inclined outer peripheral side surface 80a of the circumferential projection 80 serves as reinforcement against the bending stress. Moreover, in the second region R2, the inclined inner peripheral side surface 80b of the circumferential projection 80 serves as reinforcement against the bending stress. Therefore, pressing force of the circumferential projection 80 with respect to the sealing member 32 in the first region R1 and pressing force of the circumferential projection 80 with respect to the sealing member 32 in the second region R2 can be uniformized. Thus, water-tightness of the CVT case 20 improves.

The inclination angle θ2 of the outer peripheral side surface 80a to the die pull-out direction D1 in the first region R1 is larger than the inclination angle θ3 of the outer peripheral side surface 80a to the die pull-out direction D1 in the second region R2, and the inclination angle θ4 of the inner peripheral side surface 80b to the die pull-out direction D1 in the second region R2 is larger than the inclination angle θ1 of the inner peripheral side surface 80b to the die pull-out direction D1 in the first region R1. Therefore, while suppressing the increase in weight of the CVT case 20 by the increase in volume of the circumferential projection 80, the strength with respect to the bending stress acting on the circumferential projection 80 by the fastening power of the fastener B can be improved.

In the first region R1, the inclination angle θ2 of the outer peripheral side surface 80a to the die pull-out direction D1 is larger than the inclination angle θ1 of the inner peripheral side surface 80b to the die pull-out direction D1. Moreover, in the second region R2, the inclination angle θ4 of the inner peripheral side surface 80b to the die pull-out direction D1 is larger than the inclination angle θ3 of the outer peripheral side surface 80a to the die pull-out direction D1. Therefore, while suppressing the increase in weight of the CVT case 20 by the increase in volume of the circumferential projection 80, the strength with respect to the bending stress acting on the circumferential projection 80 by the fastening power of the fastener B can be improved.

In the first region R1, the inner peripheral side surface 80b extends in the die pull-out direction D1. Therefore, the increase in volume of the circumferential projection 80 in the first region R1 can be suppressed, and the main accommodating space S1 can be prevented from becoming small.

In the second region R2, the outer peripheral side surface 80a extends in the die pull-out direction D1. Therefore, the increase in volume of the circumferential projection 80 in the second region R2 can be suppressed.

The sectional shape of the circumferential projection 80 in the first region R1 and the sectional shape of the circumferential projection 80 in the second region R2 are asymmetrical to each other. Therefore, in the configuration in which the fastening power obliquely acts on the circumferential projection 80 projecting in the die pull-out direction D1, the circumferential projection that achieves both the suppression of the increase in weight and the improvement of the strength can be realized.

The main case 40 including the circumferential projection 80 is made of resin. Therefore, the CVT case 20 can be reduced in weight while adopting the circumferential projection 80 having a structure that hardly bends.

A specific member at which the circumferential projection 80 is disposed is the case main body 30. Since the circumferential projection 80 is disposed at the case main body 30, the circumferential projection 80 does not have to be disposed at the cover 31, and therefore, the increase in weight of the cover 31 that is handled, i.e., attached or detached can be prevented.

Since the waterproof property of the CVT case 20 is improved by the uniformization of the pressing force of the circumferential projection 80 with respect to the sealing member 32, the belt 55 can be suitably prevented from slipping by the intrusion of water into the CVT case 20.

Even if the continuously variable transmission 14 is immersed in water or covered with muddy water while the off-road vehicle 1 is travelling a rough road, the water is prevented from getting into the CVT case 20. Thus, rough road travelling performance of the off-road vehicle 1 improves.

The foregoing describes an example in which the case main body 30 is divided into the main case 40 and the auxiliary case 41. However, the case main body 30 does not have to be divided as above. The sealing member 32 does not have to be a trim seal. For example, the sealing member 32 may be a packing accommodated in a groove formed on the contact surface 31a of the cover 31 or may be a liquid gasket. The foregoing describes an example in which the specific member including the circumferential projection is the case main body 30. However, the specific member including the circumferential projection may be the cover 31. The foregoing describes an example in which the waterproof case is the CVT case 20 of the off-road vehicle 1. However, the waterproof case may be a case different from the CVT case. For example, the waterproof case may be an air cleaner case or a compressor case.

As above, the embodiment has been described as an example of the technology disclosed in the present application. However, the technology in the present disclosure is not limited to this and is also applicable to embodiments in which modifications, replacements, additions, omissions and the like are suitably made. Moreover, a new embodiment may be prepared by combining the components described in the above embodiment. The components shown in the attached drawings and the detailed explanations include not only components essential to solve the problems but also components for exemplifying the above technology and not essential to solve the problems.

What is claimed is:

1. A waterproof case comprising:
a case main body including an accommodating space and an opening through which the accommodating space is open;
a cover that closes the opening;
a sealing member interposed between the case main body and the cover; and
a fastener by which the cover is fastened to the case main body, wherein:
a specific member that is the case main body or the cover includes a bottom wall and a peripheral wall that projects from the bottom wall in a predetermined die pull-out direction and includes a circumferential contact surface;
the contact surface is a surface extending along a predetermined oblique direction inclined relative to a perpendicular plane orthogonal to the die pull-out direction;
the peripheral wall includes a first region arranged at one side in the oblique direction and a second region arranged at the other side in the oblique direction, a projection amount of the second region from the bottom wall being smaller than a projection amount of the first region from the bottom wall;
an axis of the fastener extends in a normal direction that is inclined relative to the die pull-out direction and perpendicular to the contact surface;
the specific member includes a circumferential projection that projects from the contact surface in the die pull-out direction, is arranged circumferentially along the contact surface, and presses the sealing member;
the circumferential projection includes an outer peripheral side surface and an inner peripheral side surface;
in the first region, the circumferential projection has a tapered section in which the outer peripheral side surface is inclined relative to the die pull-out direction; and
in the second region, the circumferential projection has a tapered section in which the inner peripheral side surface is inclined relative to the die pull-out direction.

2. The waterproof case according to claim 1, wherein:
an inclination angle of the outer peripheral side surface to the die pull-out direction in the first region is larger than an inclination angle of the outer peripheral side surface to the die pull-out direction in the second region; and
an inclination angle of the inner peripheral side surface to the die pull-out direction in the second region is larger than an inclination angle of the inner peripheral side surface to the die pull-out direction in the first region.

3. The waterproof case according to claim 1, wherein:
in the first region, an inclination angle of the outer peripheral side surface to the die pull-out direction is larger than an inclination angle of the inner peripheral side surface to the die pull-out direction; and
in the second region, an inclination angle of the inner peripheral side surface to the die pull-out direction is larger than an inclination angle of the outer peripheral side surface to the die pull-out direction.

4. The waterproof case according to claim 1, wherein:
in the first region, an inclination angle of the outer peripheral side surface to the die pull-out direction is 20° or more and 60° or less, and an inclination angle of the inner peripheral side surface to the die pull-out direction is 0° or more and 10° or less; and
in the second region, an inclination angle of the inner peripheral side surface to the die pull-out direction is 20° or more and 60° or less, and an inclination angle of the outer peripheral side surface to the die pull-out direction is 0° or more and 10° or less.

5. The waterproof case according to claim 1, wherein a sectional shape of the circumferential projection in the first region and a sectional shape of the circumferential projection in the second region are asymmetrical to each other.

6. The waterproof case according to claim 1, wherein the specific member is made of resin.

7. The waterproof case according to claim 1, wherein the specific member is the case main body.

8. The waterproof case according to claim 1, wherein the waterproof case is a CVT case of a continuously variable transmission of an off-road vehicle.

9. A continuously variable transmission comprising:
a CVT mechanism including a driving pulley, a driven pulley, and a belt would around the driving pulley and the driven pulley; and
a CVT case accommodating the CVT mechanism, wherein:
the CVT case includes
a case main body including an accommodating space and an opening through which the accommodating space is open,
a cover that closes the opening,
a sealing member interposed between the case main body and the cover, and
a fastener by which the cover is fastened to the case main body;
a specific member that is the case main body or the cover includes a bottom wall and a peripheral wall that projects from the bottom wall in a predetermined die pull-out direction and includes a circumferential contact surface;

the contact surface is a surface extending along a predetermined oblique direction inclined relative to a perpendicular plane orthogonal to the die pull-out direction;

the peripheral wall includes a first region arranged at one side in the oblique direction and a second region arranged at the other side in the oblique direction, a projection amount of the second region from the bottom wall being smaller than a projection amount of the first region from the bottom wall;

an axis of the fastener extends in a normal direction that is inclined relative to the die pull-out direction and perpendicular to the contact surface;

the specific member includes a circumferential projection that projects from the contact surface in the die pull-out direction, is arranged circumferentially along the contact surface, and presses the sealing member;

the circumferential projection includes an outer peripheral side surface and an inner peripheral side surface;

in the first region, the circumferential projection has a tapered section in which the outer peripheral side surface is inclined relative to the die pull-out direction; and in the second region, the circumferential projection has a tapered section in which the inner peripheral side surface is inclined relative to the die pull-out direction.

* * * * *